United States Patent [19]
Shackle et al.

[11] Patent Number: 5,011,501
[45] Date of Patent: Apr. 30, 1991

[54] PROCESS FOR MAKING A SOLID STATE CELL

[76] Inventors: Dale R. Shackle; Denis G. Fauteux; Jorgen S. Lundsgaard, all c/o The Mead Corporation, Mead World Headquarters, Courthouse Plaza Northeast, Dayton, Ohio 45463

[21] Appl. No.: 451,652

[22] Filed: Dec. 18, 1989

Related U.S. Application Data

[62] Division of Ser. No. 343,976, Apr. 26, 1989.

[51] Int. Cl.[5] .......... H01M 6/00
[52] U.S. Cl. .......... 29/623.1; 29/623.5
[58] Field of Search .......... 29/623.5, 623.1; 429/202, 205, 365, 369, 372.2, 402, 418, 419.5, 419.8

[56] References Cited

U.S. PATENT DOCUMENTS 4,631,810 12/1986 Hooper et al. .......... 29/623.5
4,730,383 3/1988 Balkanski .......... 29/623.5
4,816,356 3/1989 Balkanski .......... 429/191

*Primary Examiner*—Anthony Skapars
*Attorney, Agent, or Firm*—Thompson, Hine and Flory

[57] ABSTRACT

A solid state electrochemical laminar single cell comprising:

an alkali metal anode,
a solid ionically conducting electrolyte,
a composite cathode, and
a current collector,
wherein said electrolyte is interposed between said alkali metal anode and said cathode and said cathode is interposed between said electrolyte and said current collector,
said cell being capable of generating a discharge current per unit area greater than or equal to 50 milliamperes/cm$^2$ at room temperature; and a process for producing the cell is disclosed.

6 Claims, 1 Drawing Sheet

PROCESS FOR MAKING A SOLID STATE CELL

This is a divisional of application Ser. No. 343,976, filed Apr. 26, 1989.

BACKGROUND OF THE INVENTION

1. Field of the Invention

The present invention relates to the manufacture of a solid state electrochemical cell, and more particularly, a rechargeable solid state laminar cell including a lithium anode which is capable of generating a high current density.

2. Description of the Prior Art

Solid state electrochemical rechargeable chemical cells are the subject of intense investigation and development. They are described extensively in the patent literature. See, for example, U.S. Pat. Nos. 4,303,748 to Armand; 4,589,197 to North; 4,547,440 to Hooper, et al; and 4,228,226 to Christian. These cells are typically constructed of an alkali metal foil anode, typically lithium foil, an ionically conducting polymeric electrolyte, a composite cathode containing a finely divided transition metal oxide and an electrically-conductive filler, and a current collector. These cells present a viable option to older, more traditional, secondary cells because of their ability to generate a relatively high current per unit area and high storage capacity.

To date, solid state lithium anode batteries which have been described in the literature have only been capable of discharging current at a rate of between about 0.05 $ma/cm^2$ and 10 $ma/cm^2$. Efforts are continuing to be made to improve the efficiency of these cells.

According to Ohm's law, the voltage drop of a cell is equal to the current multiplied by the cell's internal resistance (impedance). Accordingly, for a solid state lithium cell having a voltage of 2.7 volts, if the overall impedance of the cell is reduced, the amount of current available from the cell is correspondingly increased, making it a more attractive commercial alternative.

In solid state alkali metal anode laminar cells, internal cell impedance is the product of a number of factors. An internal impedance is associated with each element of the cell, namely the anode layer, the electrolyte layer, the cathode layer, and current collector. Further, and is particularly problematic, high impedance can occur at the interfaces between these layers and, more specifically, at the anode/electrolyte interface, at the electrolyte/cathode interface and at the cathode/current collector interface. Accordingly, to produce an efficient solid state electrochemical laminar cell which is capable of delivering high current density and storage capacity, the impedance of each of these layers and interfaces must be minimized. The present invention seeks to provide as small an internal impedance as possible.

In addition to providing a cell having a minimum internal impedance, it is also desirable to produce a cell capable of operating across a wide temperature range. For example, presently available solid state lithium anode laminar cells operate very inefficiently at or below room temperature.

Accordingly, there exists a need in the art for a solid state alkali metal anode laminar cell which has a low overall impedance, and is capable of discharging a high amount of current per unit area over a broad temperature range.

SUMMARY OF THE INVENTION

The present invention relates to a solid state electrochemical alkali metal anode laminar cell capable of discharging current at an unexpectedly high rate per unit weight and volume. The cells of the present invention are capable of discharging current at a rate approximately 3 to 10 times greater than cells previously disclosed in the literature. The cells of the present invention are further characterized in being able to maintain a high current discharge rate at temperatures below room temperature.

The high energy output of the cells of the present invention is obtained by minimizing overall cell impedance. This is accomplished by minimizing impedance in each of the cell layers, as well as minimizing the impedance across the interfaces between the layers. Maintaining a minimum cell impedance in accordance with the present invention is accomplished by appropriate selection of materials used for forming the component layers of the cell, selection of optimal layer thicknesses for each of the component layers, and using manufacturing techniques which minimize interfacial impedance.

A further consideration is that the cell be operative across a wide temperature range. The inventors have discovered that by minimizing cell impedance, the resulting cell may be used across a relatively broad temperature profile, including temperatures below room temperature.

In accordance with the present invention. a solid state electrochemical laminar cell is provided. The cell includes:

an alkali metal anode;

a solid ionically-conducting electrolyte;

a composite cathode; and a current collector;

wherein said electrolyte is interposed between said alkali metal anode and said cathode, and said cathode is interposed between said electrolyte and said current collector; said cell being capable of generating a discharge current per unit area greater than or equal to 50 $ma/cm^2$ at room temperature.

In practice, the preferred anode is a lithium foil or a lithium-coated metal foil. The preferred electrolyte is a single-phase solid solution of an ionizable alkali metal salt, a solvent for the salt, and a polymer which has been polymerized by exposure to actinic radiation, heat or which has been chemically polymerized. The cathode composition preferably includes $V_6O_{13}$, electrically-conductive carbon particles and the above-described ionically-conductive electrolyte. The preferred current collector material is a nickel foil having particles of nickel electrochemically deposited on the surface of the foil which contacts the cathode composition Further, by minimizing the thickness of the layers so as to minimize the thickness-per-surface area ratio for each layer, the overall thickness of the cell can range from about 130 to about 350 microns.

In accordance with another embodiment of the present invention, the cell is produced by a process comprising the steps of:

coating a radiation polymerizable cathode composition onto a current collector;

coating an ionically-conductive polymerizable electrolyte composition onto said cathode composition;

partially or totally curing said cathode composition and said electrolyte composition; and applying an alkali metal anode onto said electrolyte composition to form a cell assembly.

In a particularly preferred embodiment, the surface of the anode layer which contacts the electrolyte composition is smoothened to remove or breakdown a passivation layer prior to coating. Further, the exterior surface of cathode composition is preferably rolled after coating onto the current collector to provide a smooth surface for the electrolyte composition to be coated thereon. In addition, in an embodiment where the electrolyte and cathode are partially cured, the entire assembly is subjected to an overall curing step after application of the alkali metal anode layer onto the electrolyte layer.

Utilization of the above method accomplishes the goals of minimizing the thickness of each layer, maximizing electrical and ionic contact between layers, and reducing the internal impedance. Accordingly, the resulting cell is capable of generating a high current per unit area.

Accordingly, it is an object of the present invention to produce a solid state electrochemical laminar cell capable of high energy output as a result of having a low cell impedance.

A further object of the present invention is to provide a solid state electrochemical laminar cell capable of high energy output wherein the cell is rechargeable.

Still another object of the present invention is to provide a solid state electrochemical laminar cell capable of generating a high current per unit area at temperatures lower than room temperature.

These, and other objects, will be readily understood by one skilled in the art, as reference is made to the following drawings and detailed description of the preferred embodiment.

DETAILED DESCRIPTION OF THE PREFERRED EMBODIMENT

While describing the preferred embodiment, certain terminology will be utilized for the sake of clarity. It is intended that such terminology include not only the recited embodiment, but all technical equivalents which perform substantially the same function, in substantially the same way to achieve substantially the same result.

Figure 1:
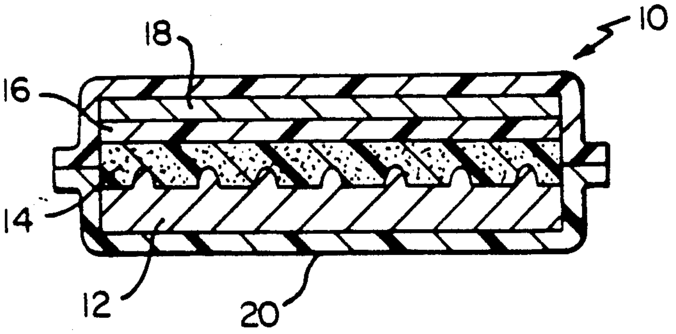
FIG. 1 is a side cut-away view of a cell embodying the teachings of the instant invention.
Figure 2A:
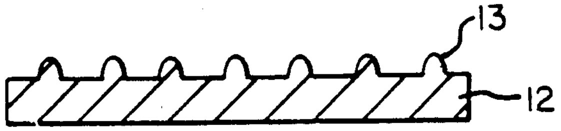
FIGS. 2(*a*)-(*e*) depict a process for producing the cell of FIG. 1.
Figure 2B:
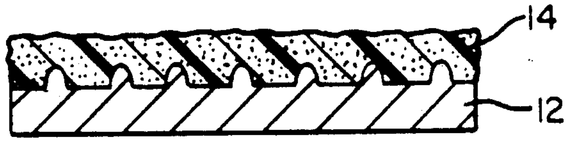
Figure 2C:
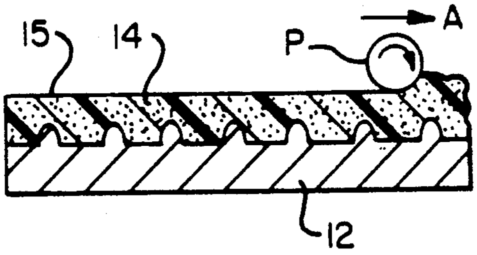
Figure 2D:
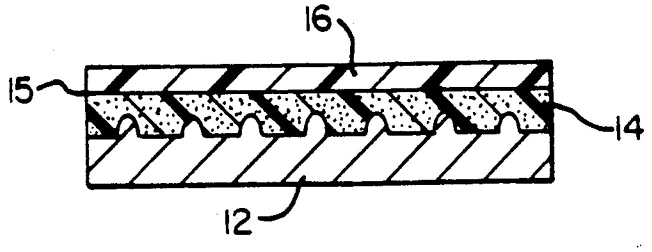
Figure 2E:
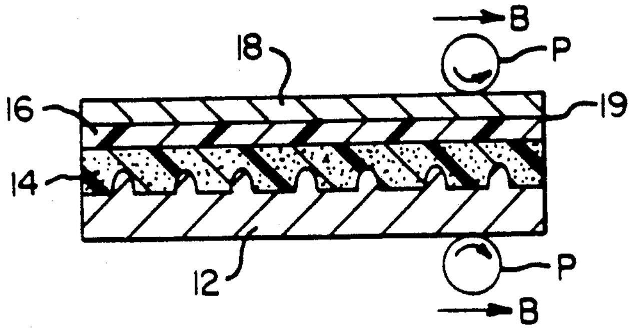

A laminar solid state cell produced in accordance with one embodiment of the present invention is shown in FIG. 1 and is represented by element 10. Cell 10 includes current collector layer 12, cathode composition layer 14, electrolyte composition layer 16 and alkali metal anode layer 18. Cell 10 also includes protective covering 20 which functions to prevent water and air from contacting the reactive layers of the cell.

Cell 10 is preferably a laminar thin cell type including a lithium anode. Laminar thin-cell batteries containing lithium anodes are known in the art, and it will be appreciated that the cell can include various constructions such as bi-faced or bipolar cell designs. Examples of cell constructions include a "jelly roll" or a fan folded laminate strip design, both of which are illustrated in U.S. patent application Ser. No. 238,071 filed Aug. 30, 1988, which is hereby incorporated by reference.

Cell 10 is particularly characterized by its ability to discharge a large amount of current per unit area. Values equal to and exceeding 50 $ma/cm^2$ at room temperature have been achieved. This can correspond to an energy density greater than 100 watt hours/liter and a power density greater than 100 watts/liter. In accordance with the present invention, energy densities exceeding 300 watt hours/liter and power densities exceeding 300 watts/liter are possible.

The high energy/power of the cell is accomplished by maintaining an overall cell impedance that is low as possible. In practice, the overall impedance should be less than 100 $ohm\text{-}cm^{-2}$ and preferably less than 50 $ohm\text{-}cm^{-2}$. To achieve such a low overall impedance, it is important to minimize the impedance of the component layers of the cell and the impedance of the interfaces between the respective layers. To further minimize overall impedance, the cell is produced by a specially designed process.

The process for producing cell 10 is depicted in FIG. 2. Because the cell produced in accordance with the process of FIG. 2 utilizes an alkali metal anode layer, usually a lithium anode layer, it is necessary to manufacture the cell in a water (humidity) free environment. Lithium is extremely reactive with water and if reacted, a passivation layer can form on the surface of the anode layer, reducing the efficiency of the layer, and increasing cell impedance. Accordingly, it is particularly desirable to manufacture the cell in an environment having a relative humidity at room temperature of less than 2% (less than 300 ppm water). An environment containing between 1 ppm and 50 ppm water produces a particularly efficient cell.

Referring to FIG. 2(*a*), cathode current collector 12 is provided. Collector 12 may be a sheet of metal foil such as aluminum, nickel or stainless steel, an electrically conductive screen, grid, foamed or expanded metal, etched foil, electrodeposited film, woven or non-woven conductive fabric In practice, a thin metal foil having a metal, preferably the same metal, electrodeposited on the surface which will contact the cathode layer is preferred. A preferred metal is known as surface-treated nickel. As seen in FIG. 2(*a*), the electrodeposited particles of nickel are designated as element 13. A microroughened or etched surface enables better adherence of the cathode composition to the current collector.

In practice, the thickness of current collector 12 ranges from about 5 microns to about 25 microns. Preferably, the current collector is as thin as practicable. Alternatively, the current collector can take the form of a thin polymeric film having coated thereon an electrically conductive metal. The advantage of this current collector is that it is extremely light-weight and can be utilized in extremely thin layers. An example of such a material is a polyethylene terephthalate substrate having electrodeposited thereon a first layer of copper and a second layer of nickel. The thickness of such a layer is typically about one micron but it may be as thin as practicable to minimize overall thickness of the cell.

Referring to FIG. 2(*b*), a cathode composition 14 is coated onto the microroughened surface of current collector 12. Cathode composition 14 is paste-like in consistency and typically includes an active cathodic material such as a transition metal chalcogenide, an intercalation compound, or an electrically conductive polymer such as polypyrrole, polyacetylene, polyaniline, etc.; an electrically conductive filler; and an ionically-conductive curable electrolyte (described below).

Intercalation compounds and electrically conductive materials useful in the present invention are known in the art. Representative examples of transition metal oxides and sulfides useful as active cathode materials are $V_6O_{13}$, $V_2O_5$, $Mo0_2$, $TiS_2$, $MnO_2$, $V_2O_5$, $MoS_3$, $Cr_3O_6$, $Li_xV_3O_8$, FeS, NiS, CoO and CuO. Other examples are described in the literature. The active cathode material preferably has a particle size of less than 1 micron but can range up to 20 microns.

A particularly preferred intercalation compound is $V_6O_{13}$ having a particle size less than 5 microns, and particularly less than one micron. $V_6O_{13}$ comprises between 25 and 75% by weight of the entire cathode composition, and preferably between 45 and 65%.

The electrically conductive filler is usually carbon particles. Certain conductive polymers (which are characterized by a conjugated network of double bonds) like polypyrrol and polyactylene may also be used for this purpose.

It is particularly desirable to maintain good contact between the cathode material and the carbon particles while maximizing the amount of cathode material available for ionic interaction. If the ratio of a cathode material such as $V_6O_{13}$ to carbon is greater than 10 to 1 by weight, the cathode composition provides poor electronic conductivity due to the lack of carbon. Conversely, if the ratio is less than 5 to 1, an excess of carbon is present which does not significantly improve electrical conductivity but does reduce capacity due to the reduced amount of intercalation compound present.

The optimum ratio of carbon to a transition metal chalcogenide will vary with particle size and processing or grinding techniques used. Preferably the carbon black and metal oxide are ball milled together. The preferred ratio is between 6 to 1 and 7 to 1. Moreover, unless the ratio of $V_6O_{13}$ to carbon is maintained between 5:1 and 10:1, it is very difficult to coat the cathode composition onto the current collector. If too much carbon is present, the cathode composition has a noncompacted sand-like consistency.

It has further been discovered that the impedance of the cathode composition is reduced when the particle size of the intercalation compound and the carbon filler is approximately equal, i.e., from less than 1 micron to about 5 microns. This can easily be accomplished by mixing and grinding the two components together.

The third component of the cathode composition is an ionically conductive electrolyte. This material is typically prepared from a composition which comprises a liquid, monomeric or prepolymeric curable compound a solution of an ionizable alkali metal salt which interpenetrates the network of the formed polymer.

Ionizable alkali metal and alkaline earth salts useful in the electrolyte include those salts conventionally used in solid state electrochemical cells. Representative examples are $Li^+$, $Na^+$, $K^+$, $Mg^{2+}$, $Ca^{2+}$, and ammonium salts of less mobile anions of weak bases having a large anionic radius. Examples may be selected from the group consisting of $I^-$, $Br^-$, $SCN^-$, $ClO_4^-$, $BF_4^-$, $PF_6^-$, $AsF_6^-$, $CF_3COO^-$, $CF_3SO_3^-$, $CF_3CO_3^-$, $B_{12}H_{12}^{2-}$, $B_{10}Cl_{10}^{2-}$, and $BO_4^-$, where O is $C_6H_5$, an alkyl chain or an aryl chain, and wherein said salt cation and said salt anion are maintained in stoichiometric amounts. Specific examples are $LiAsF_6$, $LiClO_4$, $NaClO_4$, $LiF_3SO_3$, and $LiBF_4$. $LiAF_6$ is a particularly preferred salt as is it capable of being used in relatively high amounts.

The solvent for the salt can be any low volatile aprotic polar solvent. Preferably, these materials are characterized by a boiling point greater than about 80° C. If the polymeric network is formed by radiation polymerization, the solvent should be inert to the radiation and if the network is formed by thermal polymerization, the solvent should be thermally inert. In particular, the solvent should not scavenge free radicals. Low volatility simplifies manufacture and improves shelf life. Representative examples are propylene carbonate, -butyrolactone, 1,3-dioxolane, and 2-methyltetrahydrofuran. Less polar solvents having heteroatoms capable of bonding alkali metal cations are also useful. Polyethylene glycol dimethyl ether (PEGDME) is one such example. Glymes such as tetraglyme, hexaglyme, and heptaglyme are also desirable solvents Propylene carbonate is a preferred solvent.

Polymerizable compounds useful in the electrolyte composition may yield either a conductive or non-conductive polymer. Compounds which yield a conductive polymer contain a heteroatom capable of forming donor-acceptor bonds with the alkali metal cation. Useful polymerizable compounds are described next.

Polyethylenically unsaturated monomeric or prepolymonomeric materials useful in the present invention are preferably compounds having at least one, and more preferably a plurality, of heteroatoms (particularly oxygen and/or nitrogen atoms) capable of forming donor acceptor bonds with an alkali metal cation and are terminated by polymerizable moieties. These compounds yield a conductive supportive matrix. More specifically they are preferably low molecular weight oligomers of the formulae (I)–(III) below $$A\text{+}CH_2-\underset{\displaystyle R}{\underset{|}{CH}}-O\text{+}_{n}A \qquad (I)$$

$$A\text{+}CH_2-CH_2-\underset{\displaystyle R}{\underset{|}{N}}\text{+}_{n}A \qquad (II)$$

$$A\text{+}CH_2-\underset{\displaystyle R}{\underset{|}{N}}-CH_2\text{+}_{n}A \qquad (III)$$

where n is about 3 to 50 and R is hydrogen or a C1-C3 alkyl group, which are terminated by ethylenically unsaturated moieties or glycidyl moieties represented by A.

A particularly useful group of polymerizable compounds is obtained by reacting a polyethylene glycol with acrylic or methacrylic acid. Also useful in the present invention are curable materials such as acrylated epoxies, e.g., Bisphenol A epoxy diacrylate, polyester acrylates, copolymers of glycidyl ethers and acrylates or a vinyl compound such as N-vinylpyrrolidone. The latter provide a non-conductive matrix.

The curable electrolyte mixture of this invention contains at least 45% by weight of the radiation inert liquid and about 20 to 55% by weight and preferably 25 to 40% by weight of the polymerizable compound. The exact amount of the polymerizable compound and the solvent should be adjusted to provide the optimum combination of strength and conductivity for the particular application. As a general rule, if the mixture contains less than about 20% of the polymerizable compound, the electrolyte will be too weak to maintain electrode separation. If the mixture contains greater than about 55% polymerizable material, the electrolyte exhibits poor conductivity. In those cases in which the electrolyte composition itself or an electrode composition containing the electrolyte is coated on a supporting member, such as a current collector or an electrode half element, the electrolyte often is not required to have the structural integrity of a free standing film. In those applications it is permissible and advantageous to use a higher quantity of the solvent because greater conductivity can be achieved, for example it is advantageous to use about 70 to 80% of the solvent.

Preferably, the aforementioned polymerizable polyethylenically unsaturated compounds have a molecular weight of about 200 to 2,000 and more preferably 200 to 800. Still more preferably they are liquids at temperatures less than 30° C. Examples of curable materials include polyethylene glycol-300 diacrylate (average PEO molecular weight about 300), polyethylene glycol-480 diacrylate (average PEO molecular weight about 480) and the corresponding methacrylates.

It may be desirable to include a curable comonomer in the composition to reduce the glass transition temperature and improve the conductivity of the polymer. Any suitable monoacrylate such as tetrahydrofurfuryl acrylate, tetrahydrofurfuryl methacrylate, methoxypolyethylene glycol monomethacrylate, 2-ethoxyethyl acrylate, 2-methoxyethyl acrylate or cyclohexyl methacrylate may be used for this purpose. Triacrylates such as trimethylolpropopane triacrylate (TMPTA), trimethylolpropane ethoxylated triacrylates (TMPEOTA) or trimethylolpropanepropoxy triacrylate may be used to introduce crosslinking of the polymer. Monoacrylates may be used in an amount of about 5 to 50% by weight based on the total amount of polymerizable material. The triacrylates are used in amounts of about 2 to 30% by weight on the same basis.

The polymerizable electrolyte is polymerized by radiation, heat, or chemical methods. In a particularly-preferred embodiment, the electrolyte is cured by exposure to an electron beam. The electron beam is capable of generating free radicals and initiating polymerization without any photoinitiator. Other forms of radiation, such as ultraviolet radiation, may require a photoinitiator. Similarly, if a thermal curing method is utilized, a thermal initiator should be selected. Examples of thermally-curable electrolytes are set forth in U.S. Pat. No. 4,792,504 to Schwab et al., which is hereby incorporated by reference.

Referring to FIG. 2(*b*), cathode composition 14 is coated as a thin film onto current collector 12. Coating may be accomplished using conventional coating techniques such as doctor blade or an extrusion method. In practice, the optimum thickness ranges between about 25 and about 250 microns. In order to obtain a one-hour discharge with 75–100% utilization of the cathode composition, the layer thickness ranges between 50 and 100 microns in thickness. Where a faster discharge rate is desired, a lower thickness may be selected. Conversely, if a slower discharge rate is desired, a thicker layer may be provided. In practice, the cathode composition layer has an impedance less than 50 ohms/$cm^2$.

Referring to FIG. 2(*c*), after cathode composition 14 has been coated onto current collector 12, surface 15 is rolled in the direction of arrow A by utilizing a non-stick pressure roller P, such as a PTFE roller. Alternatively, if the cathode composition sticks to the surface of roller P, a non-stick release liner, not pictured, may be placed onto surface 15, roller P can traverse the length of the release liner, and the release liner can be removed. In still another embodiment, the rolling step may involve the utilization of a continuously-operating smooth surface belt which upon contact with the cathode composition smoothens its external surface. If this technique is performed, the belt preferably has a mirrored surface. Rolling surface 15 provides benefits in that it improves adherence between cathode composition 14 and current collector 12 and produces a smoother surface which enables a very thin electrolyte layer to be coated thereon. As a result of rolling surface 15, the open circuit voltage discharge associated with cathode composition 14 is significantly reduced as compared to a cell whose cathode does not have a rolled surface. Accordingly, the overall cell efficiency is improved.

The combination of utilizing microroughened surface of current collector 12 along with the pressure rolling step following the coating of cathode composition 14 onto current collector 12 enables a tightly adherent contact to occur between the respective materials. This, in turn, reduces impedance at the collector/cathode composition interface. The impedance at the interface is typically less than 10 ohms/$cm^2$ and, in the preferred embodiment, less than 5 ohms/$cm^2$.

Referring now to FIG. 2(*d*), electrolyte layer 16 is coated as a thin film onto surface 15. Electrolyte layer 16 must be an ionically conductive composition. In the preferred embodiment, electrolyte layer 16 comprises a solution of an alkali metal salt in a radiation inert liquid, and a radiation polymerizable material. Alternatively, a thermally-curable or chemically-curable electrolyte may be selected. An electrolyte identical to that disclosed above with respect to the cathode composition is particularly preferred (e.g., a solution of $LiAsF_6$ in propylene carbonate in a radiation polymerizable monomer such as polyethylene oxide diacrylate).

An important feature of the cured electrolyte is that it remains a single phase electrolyte across a broad temperature band. When one usually compounds a carrier such as propylene carbonate and a polymer such as polyethylene oxide, the resulting material is a two-phase composition. Phase separation is particularly pronounced when the material is cooled below room temperature. By comparison, the curable composition used herein produces a single phase electrolyte. In the present invention, the monomer, salt and inert liquid are mixed together and coated. The mixture, when cured, forms a highly crosslinked polymeric network containing the alkali metal salt solution. The polymer, salt and, solvent form a homogenous, single phase which is maintained upon curing, and does not readily separate upon cooling to temperatures below room temperature. The highly stable, single phase characteristic of the electrolyte contributes to low impedance.

A further feature which helps reduce the impedance of the electrolyte layer is the selection of the type and amount of salt maintained in solution. In general the salt is used in an amount approaching its solubility limit in the electrolyte. The compositions disclosed here are capable of dissolving high amounts of salt. $LiAsF_6$ is a particularly good ionic conductor having a low impedance. The amount of salt and particularly $LiAsF_6$ maintained in the electrolyte typically ranges from about 6% to about 24%, with amounts between 15 and 20% being particularly preferred. It is hypothesized that high amounts of salt may be maintained in the electrolyte as a result of the use of the curable monomer matrix as opposed to compounding the electrolyte from a preformed polymer.

The overall impedance of the electrolyte is about or less than 300 ohm-centimeters. The electrolyte can be extruded and coated in a very thin layer, typically ranging from about 5 microns to about 25 microns. The ability to coat in a thin layer is in large part due to the continuous surface of cathode composition 15. When electrolyte 16 is coated onto surface 15, it is coated in an uncured liquid state. As is readily understood, electrolyte layer 16 must completely coat cathode composition layer 14 to prevent the intercalation compound and electrically conductive filler from protruding through electrolyte layer 16 and increasing the open circuit discharge voltage. As seen in FIG. 2(*b*), when cathode composition 14 is initially coated on current collector 12, the upper surface of cathode composition 14 is slightly irregular, having areas of higher protrusion. If not rolled, a thicker layer of electrolyte 16 would have to be coated to completely cover the surface irregularities and thereby prevent the intercalation compound and electrically conductive filler from contacting the anode layer to prevent spontaneous discharge. As increased thickness increases impedance of the electrolyte layer, the rolling of surface 15 provides a continuous coating surface for electrolyte layer 16. The thickness of electrolyte layer 16 need only be thick enough to completely coat surface 15.

The impedance between the cathode composition and electrolyte interface is extremely small, being less than 25 ohm-$cm^2$. It is hypothesized that the low interface impedance is obtained by the use of compositions having identical electrolytes, by maintaining a smooth coating surface for the electrolyte, by coating both cathode composition and electrolyte in a liquid state and by allowing a minimal amount of interface intermixing to occur.

Once electrolyte layer 16 has been coated onto surface 15, the assembly is partially or totally cured, for example, by exposure to actinic radiation. In practice, an electron beam operating at a power of 3 to 9 Mrad is particularly preferred. Alternatively an ultraviolet source may be selected. If an ultraviolet source is selected, the monomer preferably includes an ultraviolet initiator of the type commonly known in the art such as thioxanthone initiators. Alternatively, a thermal source may be selected if the monomer includes a thermal initiator. Curing the cathode composition and the electrolyte polymerizes and crosslinks and thereby solidifies the monomeric material by conversion to a polymeric form.

Of the above factors leading to a reduced interface impedance, the factor that both the cathode composition and the electrolyte layers are coated as liquids is of particular significance. This method is referred to as "wet on wet" coating in that both the cathode composition and electrolyte layers are coated as liquids and are maintained as liquids until the curing step. By comparison, batteries prepared using a "wet on dry" coating procedure generally result in higher interface impedance.

A partial curing step (as opposed to full curing) may be particularly desirable as this enables the electrolyte layer 16 to remain somewhat tacky. This enables better adherence between the electrolyte and the anode layer, when coated.

After partial or total curing of cathode composition 14 and electrolyte 16, alkali metal anode layer 18 is applied to electrolyte layer 16. Although not pictured, a thin polymeric material such as a porous polypropylene sheet may be interposed between the anode and the electrolyte to ensure that the anode does not contact the cathode layer, particularly at the outer edges of the respective layers. Use of the polymeric sheet is optional. Prior to coating it is particularly desirable to pretreat surface 19 of anode layer 18 to remove any oxide passivation layer or dendrites which may have been produced thereon. The easiest way to pre-treat surface 19 is to apply pressure from a non-stick pressure roller across the length of surface 19. In the case where anode layer 18 is lithium metal or a metal having a layer of lithium deposited thereon, removal of the passivation layer is visibly discerned by the transformation of the color of surface 19 from dull gray to shiny silver.

Alkali metal anode 18 may take the form of a lithium foil, a lithium-coated foil such as nickel or copper foil having a layer of lithium deposited on its surface or a lithium alloy. Examples of lithium alloys include Li-Al, Li-Si, Li-Sn, Li-Cd, Li-Zn, Li-Pb and Li-N. For some applications, a lithium alloy may be preferred because the mobility of lithium in the alloy may be improved, thereby preventing surface dendrite formation. However, in the most typical embodiment, a lithium foil or lithium-coated metal foil is used. Lithium is a preferred anode material because it is very electropositive and light in weight. However, other electropositive alkali metal materials, such as sodium, may be practiced within the scope of the invention.

It is desirable to minimize the thickness of the anode layer to enable the production of as thin a cell as possible and to minimize the electrolyte thickness to surface area ratio. However, because metal foils have low impedance by comparison to the balance of the cell components, this is advisable but not essential. The layer theoretically should be no thicker than necessary to supply lithium ions to the electrolyte and to provide a surface for replating the lithium metal. In practice, commercially available foils are used which range from about 50 to 125 microns.

As discussed above, it is preferred that surface 19 be continuous to enable it to uniformly transfer electricity during both charging and discharging cycles. However, if it is desired to produce a nonrechargeable primary discharge cell, surface 19 may be microroughened to provide a greater surface area for contacting electrolyte 16.

The alkali metal anode is extremely reactive with water. Another factor which has been found to contribute to overall low impedance is to manufacture the battery in a dry room or an environment containing less than 450 ppm water and preferably less than 1 or 2 ppm water.

After anode layer 18 is coated onto electrolyte 16, the entire assembly is passed through pressure rollers P in the direction of arrows B as shown in FIG. 2(*e*). The pressure rolling step aids in the adhesion of the layers to each other,. thereby reducing interfacial impedance between component layers.

If the cathode composition 16 and electrolyte 14 have not been completely cured, the entire assembly is again cured in the preferred embodiment by exposure to actinic radiation, preferably electron beam radiation. This step functions to solidify the cathode composition and electrolyte layers, thereby producing a solid state cell.

Because of the rolling of surface 19, the overall rolling of the component layers, and the optional overall curing step, a tightly adherent contact between electrolyte layer 16 and anode layer 18 occurs. This reduces impedance at the anode/electrolyte interface. In accordance with the preferred embodiment, the impedance at the anode/electrolyte interface is less than 100 ohms/cm$^2$.

Once the current collector, cathode composition, electrolyte composition and anode composition have been assembled, electrodes are attached to the anode and current collector layers by means known in the art. The assembly is then inserted into an air and water impermeable protective material and the edges of the protective material are sealed, preferably by heat sealing around edges of the cell components. Sealing preferably occurs under vacuum conditions to enable the protective material to form a tightly adherent seal around the component layers and electrodes such that the only external access to the component layers is via the electrodes.

Examples of heat sealable gas and water impermeable protective materials include a multi-layered material having an interior heat sealable layer comprising ethylene acrylic acid, an intermediate barrier layer comprising aluminum foil, and an exterior layer of polyethylene terephthalate. Other heat sealable protective materials known in the art can be used in accordance with the present invention. The protective materials should be as thin as possible to minimize the overall thickness of the cell. Commercially available heat sealable materials of the types described above can have an overall thickness of less than 200 microns.

Once the components have been inserted and sealed in the protective material, the cell is available for use by simply connecting the electrodes to the device to be powered. When utilizing a single lithium anode cell, the cell generates a voltage of approximately 2.7 volts and a current flow exceeding 50 milliamps/cm$^2$. A further feature of the cell of the present invention is that it is capable of generating a large current flow at below room temperatures.

The invention is illustrated in more detail by the following non-limiting example

EXAMPLE

In an inert, nitrogen environment, a cathode composition is prepared by grinding 300 parts of $V_6O_{13}$ for 24 to 48 hours in the present of an equal amount of tetrahydrofuran in a one liter ball mill using 1.25 cm diameter ceramic balls. After grinding, the average particle size of $V_6O_{13}$ is about 1.5 microns. The slurry is transferred to an airtight mixer and 46.2 parts of predried carbon are added to the mixer to produce a slurry having a weight ratio of $V_6O_{13}$ to C of about 6.5 to 1. The mixture is stirred at low speed (20 rpm) under vacuum and heat, until the tetrahydrofuran is evaporated. The overall water content of the mixture is less than 100 ppm. 3 parts of polyethylene oxide (PEO) having a molecular weight greater than 100,000 is added to the $V_6O_{13}$/C powder mixture. The mixture is stirred for about 10 to 20 minutes to adequately disperse the polyethylene oxide. Propylene carbonate (PC), polyethylene glycol dimethyl ether (PEGDME), and trimethylolpropane ethoxylated triacrylate (TMPEOTA) are added to the mixture to produce a mixture having the following components:

| component | percent (weight) |
|---|---|
| $V_6O_{13}$ | 45 |
| C | 7 |
| PC | 37 |
| PEO | 1 |
| PEGDA | 8.5 |
| TMPEOTA | 1.5 |

The mixture temperature is increased to 65° C. and the mixture is stirred at low speed for 20 minutes. The speed of the mixer is increased to 75 rpm and the mixture is stirred for 2 to 3 additional hours.

The mixture is then coated onto a 5 cm×20 cm×25 micron high surface treated nickel foil available from Fukuda Metal Foil & Powder Co. Ltd. of Kyoto, Japan by utilizing a doctor blade technique at 50°-60° C. in a completely inert (nitrogen) environment containing less than 25 ppm water. The thickness of the cathode layer is 75 microns and the cathode layer is then covered with a stainless steel foil. A 2 inch diameter, 10 inch long stainless steel roller is placed on top of the foil and the roller is rolled along the length of the foil at a pressure of 5-10 kg/cm$^2$ to improve adherence of the cathode layer to the current collector. The assembly is then irradiated with a 3 Mrad dose of radiation by utilizing an electron beam source to cure the cathode layer. The foil is then peeled off of the cathode layer. The impedance of the cathode is less than 50 ohm/cm$^2$.

An electrolyte is prepared by mixing together the following components in the following weight fractions:

| component | percent (weight) |
|---|---|
| PC | 68 |
| $LiAsF_6$ | 18 |
| PEO | 2.5 |
| PEGDA | 9.2 |
| TMPEOTA | 2.3 |

The overall water concentration of the electrolyte is less than 50 ppm. The electrolyte is coated onto the cathode layer by using a doctor blade at room temperature to a thickness of about 25 microns. The electrolyte is then irradiated with a 3 Mrad dose of radiation from an electron beam source. The impedance of the electrolyte layer is about 0.8 ohm/cm$^2$.

A 4 cm×12.5 cm×125 micron thick lithium strip (lithium metal/battery grade) available from Lithco of Bessemer City, NC is applied to one end of the electrolyte layer and the lithium strip is adhered to the layer by applying pressure from a 2 inch diameter, 10 inch long roller at 5-10 kg/cm$^2$ across the entire lithium surface. The opposite end of the electrolyte/cathode/current collector assembly is folded over the anode layer to form a bifaced cell. Copper tabs were spot welded to the current collector and pressure rolled onto the lithium foil to form electrodes for connection to a device.

The physical and mechanical properties of the produced battery were as follows:

| property | value |
|---|---|
| surface area | 100 cm$^2$ |
| volume | 2 cm$^3$ |
| capacity | 250 mAh |
| average voltage | 2.4 V |
| discharge time (50 mA drain) | 5 hours |

-continued

| property | value |
|---|---|
| discharge time (250 mA drain) | 0.5 hours |
| discharge time (10 A pulses) | 1.5 minutes |
| energy density | 300 wh/l |
| overall impedance | 150 ohm/cm$^2$ |

Having described the invention in detail and by reference to preferred embodiments thereof, it will be apparent that modifications and variations are possible without departing from the scope of the invention defined in the appended claims.

What is claimed is:

1. A process for making a solid state alkali metal cell capable of generating a discharge current per unit area greater than or equal to 50 milliamperes per square centimeter at room temperature comprising the steps of:

coating a cathode composition layer comprising an active cathode material, an electrically conductive filler material, an alkali metal salt, an inert liquid solvent for said salt and a polymerizable material onto a current collector layer;

coating an ionically conductive, polymerizable electrolyte composition layer onto said cathode composition layer;

partially or totally curing said cathode composition and said electrolyte composition; and applying an alkali metal anode composition layer onto said electrolyte composition layer to form a cell assembly.

2. The cell according to claim 1 wherein said process includes the additional step of applying pressure to said cell assembly to further adhere said layers.

3. The process according to claim 2 wherein said process comprises the additional step of rolling the surface of said cathode composition which is not in contact with said current collector layer, said rolling step occurring just prior to said electrolyte layer coating step.

4. The process according to claim 3 wherein said curing step comprises partial irradiation or partial thermally curing of said cathode composition layer and said electrolyte composition layer and wherein said process comprises the additional step of complete irradiation or complete thermally curing of said cathode composition layer and said electrolyte composition layer directly after applying said alkali metal anode composition layer.

5. The process according to claim 4 wherein said process comprises the additional step of rolling the surface of said alkali metal anode composition layer which is to contact said electrolyte layer, said rolling step occurring prior to coating said alkali metal anode layer.

6. The process of claim 5 wherein said process is carried out in an atmosphere containing less than 4 ppm water.

* * * * *